Aug. 10, 1948.   E. E. GARRETT ET AL   2,446,754
RATE GENERATING MECHANISM
Filed April 12, 1940

INVENTORS
Elmer E. Garrett
Walter F. Conable
BY Victor D. Borst
ATTORNEY.

Patented Aug. 10, 1948

2,446,754

UNITED STATES PATENT OFFICE 2,446,754

RATE GENERATING MECHANISM

Elmer E. Garrett, Floral Park, and Walter F. Conable, Bellerose, N. Y., assignors to Ford Instrument Company, Inc., Long Island City, N. Y., a corporation of New York Application April 12, 1940, Serial No. 329,216

8 Claims. (Cl. 74—1)

The invention herein disclosed relates to a cam mechanism for generating a motion at a rate proportional to a function of a quantity, and more particularly to a mechanism of this type that is effective over a wide range of input values.

Mechanisms of this type to which this invention relates have been long known and used in certain types of computing mechanisms. But most of such mechanisms have been limited in operation to a range of input values for which the function varies within the limits of a ratio of approximately fifteen to one. Theoretically, such mechanisms should be capable of operation over a wide range of input values but they are limited mechanically by the fact that with the maximum rotational value of the cam determined for a given range of output, there is a maximum slope which can be followed and there is a minimum lead for which a following device may be provided. The invention herein disclosed avoids these limitations by transferring the function to succeeding cams of higher rotational value when the point of minimum lead is reached.

The invention herein disclosed has for an object to provide a mechanism of the type referred to that is operative over a wide range of input values and that, for all practical purposes, is operative over an unlimited range of input values. The object of the invention is accomplished by combining two or more cams in such a way that each is operative, within its limits of operability, to generate a motion proportional to a function of a portion of the desired range of input values. This interrelation or combination of cams is so effected that each cam comes into use only when the input value exceeds the operable range of the preceding cam or cams. In this way, a multiplicity of cams may be associated and combined into a single mechanism to generate motion as a function of quantities varying over a practically unlimited range of input values.

Figure 1:
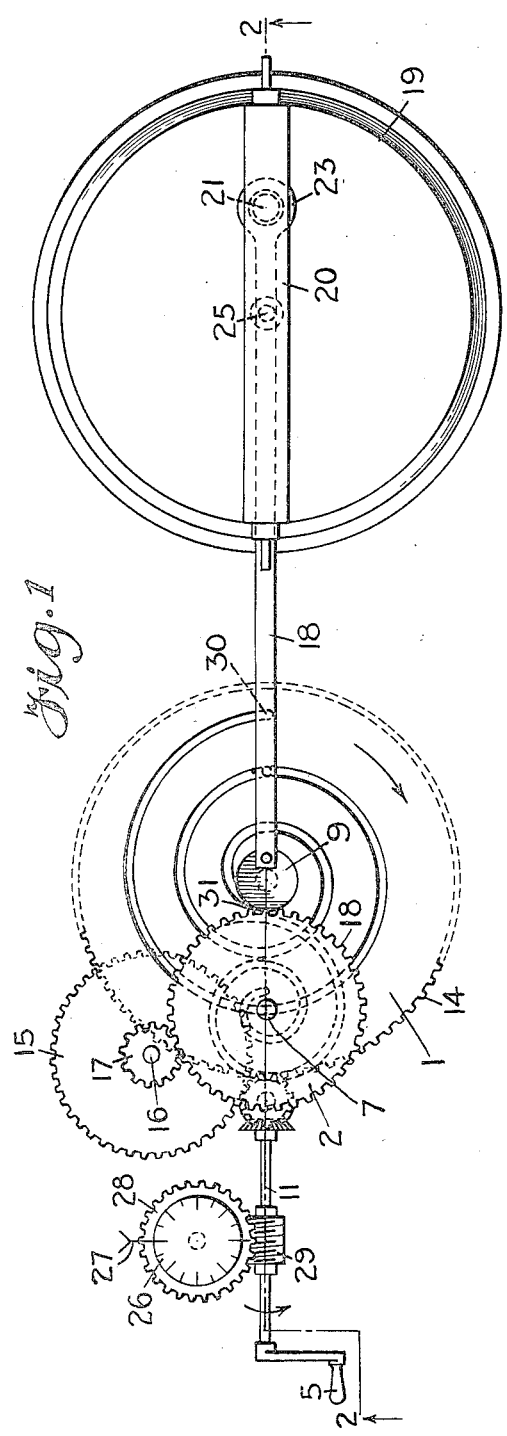
Figure 2:
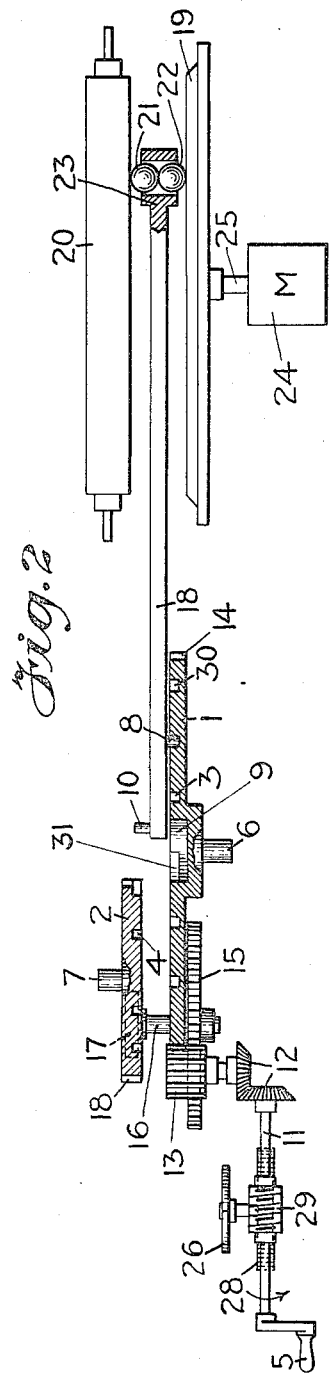

In the accompanying drawings:

Fig. 1 is a diagrammatic plan view of an embodiment of the invention, showing two cooperating cams and a variable speed mechanism; and Fig. 2 is a section in elevation taken along line 2—2 of Fig. 1.

The particular mechanism selected for illustration is one that operates to produce a rate of motion proportional to the reciprocal of an input quantity. With two cams, each with a practical ratio of fifteen to one, it is capable of operation over a range of input values varying between the limits of values having a ratio of two hundred twenty-five to one. However, for convenience, it is hereinafter described as having an operable range of generated rates proportional to the reciprocal of input quantities varying within the limits of values in a ratio of one hundred to one.

In general, the mechanism illustrated in the drawings includes two cams 1 and 2 with cam grooves 3 and 4 respectively cut in their operating surfaces. The cams 1 and 2 are connected to a rotatable input element 5, illustrated as a hand-crank, through gears to be described in detail hereinafter. Each cam in the mechanism illustrated functions to produce a rate proportional to a function, the reciprocal of the input quantity, over a portion of the range of input values. The value of the input quantity is determined by the angular movement of the hand-crank 5. Each cam has an operable limit over a range of input values within the limits of a ratio of ten to one. Before the input element or handle 5 has been rotated an amount representing a value beyond the portion of the range of input values for which one cam is effective, the other cam comes into action.

Thus, assuming that the range of input values for which it be desired that the mechanism function is between twenty thousand and two hundred, the operation of the cams will be as follows: Since the output is a rate proportional to the reciprocal of the input, the greater the input, the smaller the output rate. Thus cam 2 is arranged to take care of values from twenty thousand to two thousand and cam 1 will operate while the value of the input changes from two thousand to two hundred. It will be appreciated that were the cams designed to produce a rate directly proportional to a quantity rather than proportional to the inverse of the quantity, cams 1 and 2 would successively come into action in accordance with ascending values rather than descending values.

In detail, cams 1 and 2 are mounted on their centers on shafts 6 and 7 respectively. The grooves 3 and 4 are spiral in form and designed such that the movement of a cam follower 8, in the case of cam 1, from the outside of the cam is inversely proportional to the angular movement of the cam. At the inner end of the spiral cam groove 3, there is a circular space 9 in the face of the cam to permit additional movement of the cam follower 8 when the cam follower 10 has been moved into position to engage cam groove 4.

The cams 1 and 2 are rotated as follows: Motion from the handle 5 is transmitted through shaft 11 to bevel gears 12 and thence to gear 13 which is in mesh with the gear teeth 14 of cam 1. Gear 13 is also in mesh with gear 15 secured on shaft 16 on the other end of which is gear 17 which meshes with gear teeth 18 on the periphery of cam 2. The gears 13, 15 and 17 and the periphery of the cams 1 and 2 are such that shaft 7 on which cam 2 is mounted turns but one revolution for each ten revolutions of shaft 6.

The cam followers 8 and 10 are secured to a movable element or arm 18 of a variable speed device. The variable speed device illustrated consists of a rotatably mounted driving element or disk 19, a rotatably mounted driven element or roller 20 and a pair of balls 21 and 22 constituting a driving connection between the driving and driven elements. The balls are constrained in a ball carriage 23 attached to the arm 18 and are movable from the center of the disk to a point adjacent the periphery of the disk. The disk 19 is driven at a constant speed by a constant speed motor 24 connected to the disk by shaft 25. Such variable speed devices are well known, a suitable one being illustrated and described in Patent No. 1,317,915 issued October 7, 1919.

From the foregoing it will be seen that the cams 1 and 2 are rotated proportionally to the rotation of the input element. In consequence, the cam follower 8 or 10, whichever is engaged with cam 1 or cam 2, through the arm 18 moves the ball carriage 23 of the variable speed device proportionally to the inverse or reciprocal of the quantity introduced, represented by the angular movement of the handle 5. Thus the driven element 20 of the variable speed device is rotated at a rate proportional to the reciprocal of the input quantity.

A scale 26 cooperating with index line 27 is mounted on a gear 28 which is connected to shaft 11 by gear 29. There is thus provided a mechanism to observe the instantaneous values of the input quantity.

For the purpose of explaining the operation of the mechanism we may assume that the instantaneous value of the input is two hundred. Cam follower 8 would therefore be at the outer end 30 of groove 3. By rotating the shaft 11 in the direction indicated by the arrow, cam 1 is rotated as indicated by the arrow thereon moving cam follower 8 towards the center of the cam. Before cam follower 8 has reached the inner end 31 of groove 3, cam follower 10 engages in the cam groove 4 of cam 2 and arm 18 continues to move towards the left as cam follower 10 moves towards the center of cam 2. The hollow space 9 in the face of cam 1 permits cam follower 8 to move freely after it has reached the end and passed out of cam groove 3.

The invention is disclosed as two cooperating cams, the output of which is connected to a variable speed mechanism. It will be understood that the output of the cams may be connected to the input of a multiplier or divider or other type of mechanism. Also, the invention may be applied to three or more cams.

It is obvious that various changes may be made by those skilled in the art in the embodiment of the invention illustrated in the drawings and described above within the principle and scope of the invention as expressed in the appended claims.

We claim:

1. Means for obtaining an output rate proportional to a function of an input over a wide range comprising input means including two cams mounted to rotate about parallel, laterally displaced axes, means to introduce input values into said input means including a transmission operable on the cams individually and at different ratios, output means settable by said cams one at a time and continuously over the said wide range.

2. Means for obtaining an output rate proportional to a function of an input over a wide range comprising input means including a plurality of cams mounted to rotate about parallel, laterally displaced axes, means to introduce input values into said input means including a transmission operable on the cams individually and at different ratios, output means settable by said cams one at a time and continuously over the said wide range.

3. Means for obtaining an output rate proportional to a function of an input over a wide range comprising input means including two cams mounted to rotate about parallel, laterally displaced axes, means to introduce input values into said input means including a transmission operable on the cams individually and at different ratios, output means, and two cam followers connected to actuate said output means and adapted to engage said cams one at a time and continuously over said wide range.

4. Means for obtaining an output rate proportional to a function of an input over a wide range comprising input means including two cams mounted to rotate about parallel, laterally displaced axes, means to introduce input values into said input means including a transmission operable on the cams individually and at different ratios, output means, and two cam followers connected to actuate said output means, one cam follower being adapted to engage one of said cams over one portion of said range and the other cam follower being adapted to engage the other of said cams over the other portion of said range.

5. Means for obtaining an output rate proportional to a function of an input over a wide range comprising input means including two cams mounted to rotate about parallel, laterally displaced axes, output means settable by one of said cams through one portion of said range and settable by the other of said cams through the other portion of said range, and means to introduce input values into the input means including a transmission having two branches, the said branches leading to their corresponding cams at different ratios.

6. Means for obtaining an output rate proportional to a function of an input over a wide range comprising input means including two cams mounted to rotate about parallel, laterally displaced axes, output means settable by one of said cams through one portion of said range and settable by the other of said cams through the other portion of said range, and means to introduce input values into the input means including a transmission having a branch leading to each cam at a different ratio.

7. In cam mechanism for obtaining an output movement proportional to a function of an input over a wide range, a member the movement of which represents the output, an input element the movement of which represents the input, a plurality of cams movable by said input element and mounted to rotate about parallel, laterally displaced axes, a plurality of followers associated with said output member and adapted to successively engage said plurality of cams, whereby the said output member is continuously moved in proportion to the function of the input.

8. Means for obtaining an output rate proportional to a function of an input over a wide range comprising input means including two cams mounted to rotate about parallel, laterally displaced axes, means to introduce input values into said input means including a transmission operable on the cams individually and at different ratios, and output means including a variable speed device having a rate control member settable by said cams one at a time and continuously over the said wide range.

ELMER E. GARRETT.
WALTER F. CONABLE.

REFERENCES CITED

The following references are of record in the file of this patent:

UNITED STATES PATENTS

| Number | Name | Date |
|---|---|---|
| 1,971,238 | Silling | Aug. 21, 1934 |

FOREIGN PATENTS

| Number | Country | Date |
|---|---|---|
| 364,623 | Germany | Nov. 29, 1922 |